United States Patent [19]

Yoshimura et al.

[11] 4,145,749
[45] Mar. 20, 1979

[54] LOG IN-OUT SYSTEM FOR LOGIC APPARATUS

[75] Inventors: Tatsuro Yoshimura, Kawasaki; Takamitsu Tsuchimoto, Tokyo; Katsuyuki Hamada, Kawasaki, all of Japan

[73] Assignee: Fujitsu Limited, Kawasaki, Japan

[21] Appl. No.: 836,077

[22] Filed: Sep. 23, 1977

[30] Foreign Application Priority Data

Sep. 29, 1976 [JP] Japan .................. 51-115994

[51] Int. Cl.² .............. G01R 15/00; G11C 7/00; G11C 17/00
[52] U.S. Cl. .................. 364/900; 307/208; 307/303; 324/73 R
[58] Field of Search ......... 307/208, 262, 303, DIG. 5; 324/73 R, 158 R; 364/900 MS File

[56] References Cited

U.S. PATENT DOCUMENTS

| | | | |
|---|---|---|---|
| 3,855,580 | 12/1974 | Lighthall et al. | 307/DIG. 5 |
| 3,893,033 | 7/1975 | Finch | 307/208 |
| 3,903,433 | 9/1975 | Leuschner | 307/303 |
| 3,919,695 | 11/1975 | Gooding | 364/200 |
| 3,924,144 | 12/1975 | Hadamard | 307/303 |
| 3,932,841 | 1/1976 | Deerfield et al. | 364/200 |

FOREIGN PATENT DOCUMENTS 50-55240  5/1975  Japan .................. 307/303

Primary Examiner—Mark E. Nusbaum
Assistant Examiner—Michael C. Sachs
Attorney, Agent, or Firm—Daniel Jay Tick

[57] ABSTRACT

A plurality of logic circuits having log in-out functions are connected in sequence. A clock distribution circuit is connected to each sequential logic circuit via a corresponding one of a plurality of bidirectional lines. A mode designation signal is supplied in common to each sequential logic circuit and the clock distribution circuit. A sequential logic circuit selection signal, which selects one of the sequential logic circuits, is supplied to the clock distribution circuit. A clock signal is supplied from the clock distribution circuit to each sequential logic circuit via the bidirectional lines in the clock mode. Log in data is supplied from the clock distribution circuit to the sequential logic circuit via a specific bidirectional line in accordance with the sequential logic circuit selection signal in the log in mode. Log out data is supplied to the clock distribution circuit from the sequential logic circuit in the log out mode via a specific bidirectional line in accordance with the sequential logic circuit selection signal.

4 Claims, 4 Drawing Figures

LOG IN-OUT SYSTEM FOR LOGIC APPARATUS

BACKGROUND OF THE INVENTION

The present invention relates to logic apparatus such as data processing equipment. More particularly, the invention relates to a log in-out system for logic apparatus having a plurality of logic circuits connected in sequence and providing sequential processing. Still more particularly, the invention relates to a log in-out system wherein the sequential logic circuits are integrated circuits.

When a logic device includes an integrated circuit or IC, or a particularly large scale integrated circuit of LSI, the LSIs generally include a plurality of latches. For this reason, a sequential logic circuit is provided. Analysis and diagnosis of internal conditions are therefore difficult when testing using only the input and output terminals. It is thus necessary to supply data to a desired latch circuit included in the LSI or to read data of a desired latch, that is, to log in-out, in addition to the input-output terminals. Various methods are proposed for this purpose. However, in a log in-out system of a known LSI, a log in data input terminal, log in designation signal input terminal, log out data output terminal and log out designation signal output terminal are provided, and at least four terminals are required for log in-out. However, the increment of terminals is severely limited in the LSI and it is undesirable that four terminals be necessary for log in-out.

The principal object of the invention is to provide a log in-out system which solves the problem of the number of terminals in a log in-out system.

An object of the invention is to provide a log in-out system which has a reduced number of terminals for log in-out.

Another object of the invention is to provide a log in-out system of simple structure which is inexpensive in manufacture.

BRIEF SUMMARY OF THE INVENTION

The log in-out system of the invention reduces the number of terminals for log in-out using a clock signal input terminal, which has been used, in common for input and output of log in-out data and newly providing a mode designation signal input terminal for switching the used mode of the terminal. A large scale integrated circuit or LSI is simultaneously provided for clock distribution and log in-out is provided for in addition to the integrated circuit. An LSI is used for clock signal distribution, but its purpose is to adjust the delay time up to the LSI in each designation, or to amplify the clock pulse output. This is different from the clock distribution circuit provided in the system of the invention, in purpose, structure or configuration and effect or result.

A known LSI executes log in-out for each sequential logic circuit LSI. However, the LSI and the sequential logic circuit LSI are connected via at least four wires. In the system of the invention, the clock distribution LSI and the log in-out LSI are formed as a single LSI and only a single bidirectional line is required for connecting such LSI to each sequential logic LSI.

In accordance with the invention, a log in-out system for logic apparatus having a plurality of logic circuits connected in sequence, said logic circuits having a log in-out function, comprises a plurality of sequential logic circuits each having first input or mode designation signal input terminals for inputting a mode or mode designation signal which designates at least three modes including a clock mode, a log in mode and a log out mode, a second or clock and log in-out terminal, and a control circuit connected across the first input or mode designation signal input terminals and the second or clock and log in-out terminal for providing a clock signal as input from said clock and log in-out terminal when said mode designation signal designates the clock mode, providing log in data as input from said clock and log in-out terminal when said mode designation signal designates the log in mode and providing log out data as output from said clock and log in-out terminal when said mode designation signal designates the log out mode. A clock distribution circuit has third input or mode designation signal input terminals for inputting the mode designation signal, a fourth input or clock signal input terminal for inputting a clock signal, fifth input or sequential logic circuit selection signal input terminals for inputting a circuit selection or sequential logic circuit selection signal to select one of the sequential logic circuits, a plurality of sixth or clock and log in-out terminals corresponding to each of said sequential logic circuits, a seventh input or log in data input terminal, an eighth output or log out data output terminal, and a control circuit comprising a mode detector connected to the first input terminals, said mode decoder having a plurality of outputs, a selection decoder connected to the fifth input terminals, said selection decoder having a plurality of outputs, and a plurality of gate circuits. Each of the gate circuits corresponds to a respective one of the sequential logic circuits. Each of the gate circuits is connected to each of the selection decoder outputs and to a corresponding one of the sixth terminals. The gate circuits are connected to the fourth input terminal, the seventh input terminal, the eighth output terminal and the mode decoder outputs in common. Each of a plurality of bidirectional lines connects a corresponding one of the clock and log in-out terminals of the clock distribution circuit to the clock and log in-out terminal of a corresponding one of the sequential logic circuits. A mode designation signal lead connects the mode designation signal input terminal of said clock distribution circuit to each of said sequential logic circuits in common.

Each of the sequential logic circuits and the clock distribution circuit respectively comprises a single chip integrated circuit device.

Each of the sequential logic circuits includes a latch circuit having a ninth input or clock signal input terminal, a tenth input or a log in data input terminal and an eleventh output or log out data output terminal, and a control circuit including a mode designation signal decoder connected to the mode designation signal input terminal for decoding the mode designation signal into a clock mode signal, a log in mode signal and a log out mode signal. A first OR gate connects the clock and log in-out terminal to the clock signal input terminal of the latch circuit via the clock mode signal. A second OR gate connects the clock and log in-outterminal to the log in data input terminal of the in-out terminal circuit via the log in mode signal. A NOR gate connects the clock and log in-out terminal to the log out data output terminal of the latch circuit via the log out mode signal.

Each of the sequential logic circuits includes a plurality of the latch circuits and includes a latch address input terminal for inputting a latch address for selecting one of the latch circuits. The control circuit of each of the sequential logic circuits includes a latch address signal decoder and a latch selection signal input terminal connected to the latch address signal decoder.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
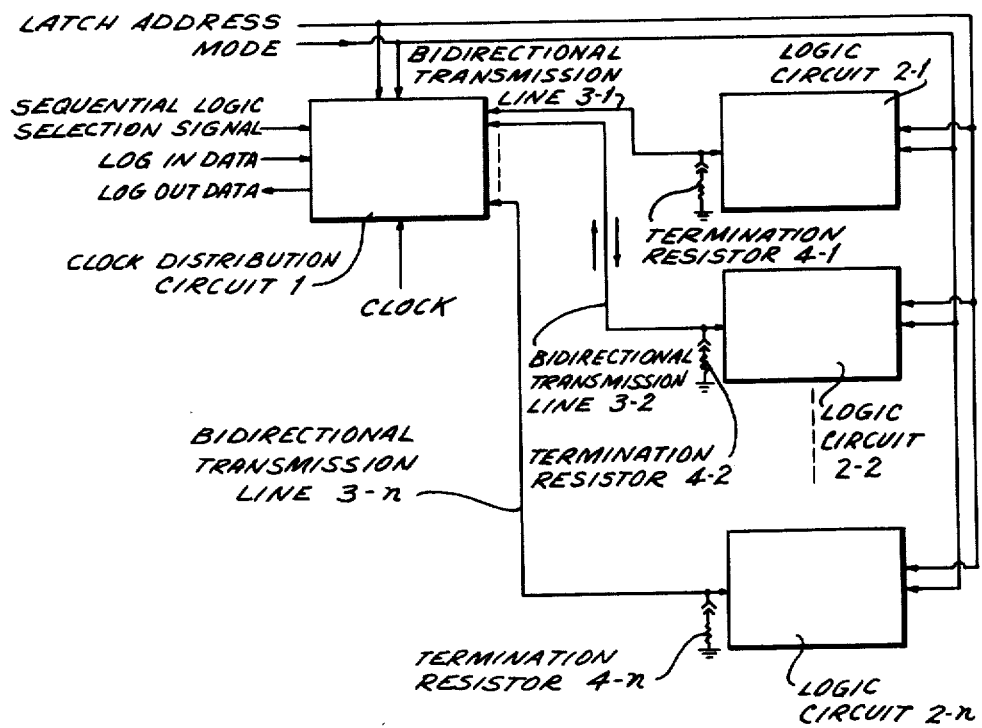
FIG. 1 is a block diagram of a preferred embodiment of the log in-out system of the invention.

In FIG. 1, a clock distribution circuit 1, including log in-out, is formed as a large scale integrated circuit or LSI. Logic circuits 2-1, 2-2, ..., 2-n are formed in LSIs. The logic circuit 2-1 is connected to the clock distribution circuit 1 via a bidirectional transmission line 3-1. The logic circuit 2-2 is connected to the clock distribution circuit 1 via a bidirectional transmission line 3-2. The logic circuit 2-n is connected to the clock distribution circuit 1 via a bidirectional transmission line 3-n.

Termination resistors 4-1, 4-2, ..., 4-n are connected to the transmission lines 3-1, 3-2, ..., 3-n, respectively, and each is connected to a point at ground potential at the end terminal of a corresponding one of the logic circuits 2-1 to 2-n, respectively.

In the system of the invention, as shown in FIG. 1, the mode designation signal is fed or supplied to the clock distribution circuit 1. Simultaneously, a control signal, including the mode designation signal, is supplied to the sequential logic circuits 2-1 to 2-n. Furthermore, the system operation mode is switched, for example, to the following four modes. The first is the clock mode. The second is the log in mode. The third is the log out mode. The fourth is the reset mode. In addition, the transmission of data signals including the clock signal, the log in data signal and the log out data signal, between the clock distribution circuit 1 and each sequential logic circuit 2-1 to 2-n is performed in accordance with the aforedescribed four modes via one of the transmisson lines 3-1 to 3-n, respectively.

The operation of the system of the invention is explained for each of the aforedescribed four modes as follows. In the first, or clock mode, the clock signal fed to the clock distribution circuit 1 is distributed to each transmission line 3-1 to 3-n and is then transmitted to each sequential logic circuit 2-1 to 2-n. In each sequential logic circuit 2-1 to 2-n, predetermined processing is provided in synchronization with the clock signal.

In the second, or log in mode, the sequential logic circuit selection signal is fed to the clock distribution circuit 1, whereby one of the sequential logic circuits 2-1 to 2-n having the latch circuit to be logged in is selected, the desired latch circuit in the sequential logic circuit selected by the latch address signal is selected, and the log in data signal is transmitted to the latch circuit. The latch circuit performs the log in via the transmission line 3-1 to 3-n corresponding to the selected sequential logic circuit 2-1 to 2-n.

In the third, or log out mode, as in the case of the aforedescribed log in mode, the desired latch circuit is selected by the sequential logic circuit selection signal and the latch address signal. The data which the selected latch circuit has, that is, the log out data signal, is transmitted to the clock distribution circuit 1 via the transmission line 3-1 to 3-n corresponding to the sequential logic circuit including said latch circuit, whereby the log out data signal is extracted.

In the fourth, or reset mode, every latch circuit in every sequential logic circuit 2-1 to 2-n is reset by the mode designation signal, which is fed in commmon to the sequential logic circuits 2-1 to 2-n.

The termination resistor 4-1 to 4-n provided at the end terminal of each of the sequential logic circuits 2-1 to 2-n, respectively, of each of the transmission lines 3-1 to 3-n, respectively, is connected to provide correct matching. This is true, even in the case of the clock mode, which requires comparatively critical operation because in this mode particularly high speed operation is provided among the aforedescribed four modes of operation.

Figure 2:
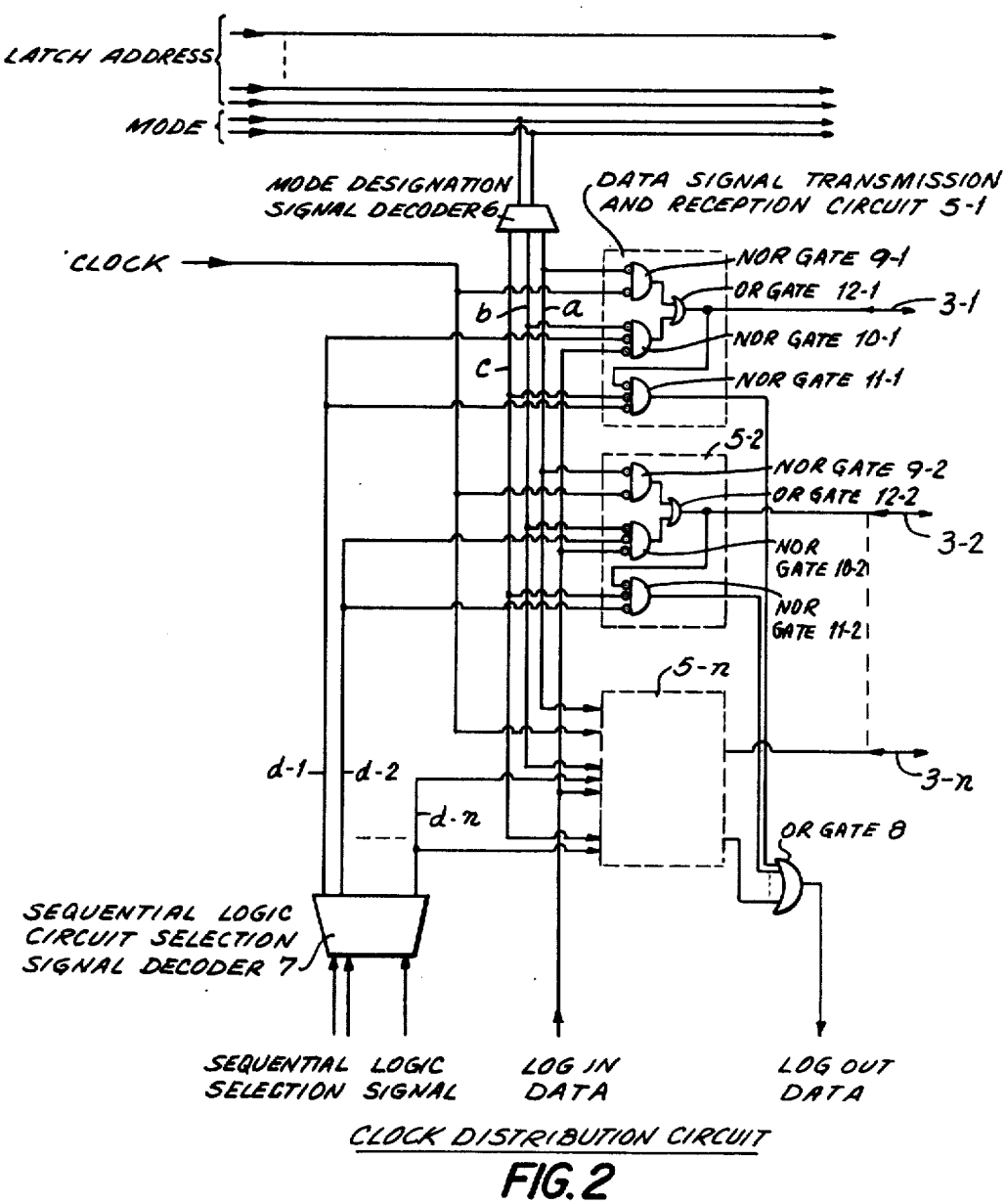
FIG. 2 is a block diagram of an embodiment of the clock distribution circuit of the system of FIG. 1.

FIG. 2 shows a specific embodiment of the clock distribution circuit 1 of the system of the invention. In FIG. 2, the transmission lines 3-1 to 3-n are those of FIG. 1. In the clock distribution circuit 1 of FIG. 2, data signal transmission and reception circuits 5-1, 5-2, ... ,5-n are connected to the transmission lines 3-1, 3-2, ... ,3-n, respectively. A mode designation signal decoder 6 is connected between mode designation signal lines and each of the data signal transmission and reception circuits 5-1 to 5-n, respectively. The mode designation signal decoder 6 decodes the mode designation signal and, for example, generates three types of clock mode signal, log in mode signal and log out mode signal.

A sequential logic circuit selection signal decoder 7 is connected between sequential logic selection signal lines and each of the data signal transmission and reception circuits 5-1 to 5-n, respectively. The sequential logic circuit selection signal decoder 7 decodes the address data for the sequential logic circuits 2-1 to 2-n wherein log in and log out is performed.

An OR gate 8 has inputs connected to each of the data signal transmission and reception circuits 5-1 to 5-n and an output which provides log out data. changes The data signal transmission and reception circuits 5-1 to 5-n comprise NOR gates 9-1 to 9-n, respectively, each having an input connected to the mode designation signal decoder 6 and another input connected to a clock signal line. The NOR gates 9-1 to 9-n are used in the clock mode. The data signal transmission and reception circuits 5-1 to 5-n further comprise NOR gates 10-1 to 10-n, respectively, each having an input connected to a log in data line, a second input connected to the mode designation signal decoder 6 and a third input connected to the sequential logic circuit selection signal decoder 7. The NOR gates 10-1 to 10-n are used in the log in mode.

The data signal transmission and reception circuits 5-1 to 5-n further comprise NOR gates 11-1 to 11-n, respectively, each having an input connected to the sequential logic circuit selection signal decoder 7, a second input connected to the mode designation signal decoder 6 and a third input. The NOR gates 11-1 to 11-n are used in the log out mode. The data signal transmission and reception circuits 5-1 to 5-n still further comprise OR gates 12-1 to 12-n, respectively, each having an input connected to the output of the NOR gate 9-1 to 9-n, respectively, and another input connected to the output of the NOR gate 10-1 to 10-n, respectively. The outputs of the OR gates 12-1 to 12-n are connected to the transmission lines 3-1 to 3-n, respectively, and to the third inputs of the NOR gates 11-1 to 11-n, respectively.

The operation of the clock distribution circuit 1 for the aforedescribed four modes of operation is as follows. In the first, or clock mode, the mode designation signal decoder 6 supplies a logic signal "0" only to a clock mode signal lead a and supplies a logic signal "1" to another log in mode signal lead b and a log out mode signal lead c. Therefore, in each data signal transmission and reception circuit 5-1 to 5-n, only the NOR gates 9-1 to 9-n are respectively turned ON and the clock signal is transmitted to each transmission line 3-1 to 3-n via each said NOR gate 9-1 to 9-n and the OR gates 12-1 to 12-n, respectively. The clock signal transmitted to each transmission line 3-1 to 3-n is then respectively supplied to the sequential logic circuits 2-1 to 2-n.

In the second, or log in mode, the mode designation signal decoder 6 supplies logic "0" only to the log in mode signal lead b and logic "1" to the other signal leads a and c. On the other hand, the sequential logic circuit selection signal decoder 7 decodes the sequential logic circuit selection signal and supplies a logic "0" signal only to one of the output leads d-1, d-2 . . . , d-n of said decoder for the data signal transmission and reception signal circuits 5-1, 5-2, . . ., 5-n corresponding to the sequential logic circuits 2-1, 2-2, . . . 2-n, respectively, having a latch circuit for log in the logic "1" in all of the other output leads. More particularly, if the relevant latch circuit is included, for example, in the logic circuit 2-2, the logic signal "0" is supplied only to the output lead d-2 and the logic signal "1" is supplied to the other output leads d-1, d-3, . . . ,d-n respectively. Only the NOR gate 10-2 in the data signal transmission and reception circuit 5-2 corresponding to the sequential logic circuit 2-2 is turned ON and the log in data signal is supplied to the transmission line 3-2. The log in data signal supplied to the transmission line 3-2 is logged in to the relevant latch circuit hereinafter described with reference to FIG. 3.

In the third or log out mode, the mode designation signal decoder 6 supplies the logic signal "0" only to the log out mode signal lead c. On the other hand, the sequential logic circuit selection signal decoder 7 supplies the logic signal "0" only to the output lead d-1, d-2, . . . ,d-n for the data transmission and reception circuit 5-1, 5-2, . . . ,5-n corresponding to the sequential logic circuit 2-1, 2-2, . . . ,2-n, respectively, having a latch circuit for log out. More particularly, if the relevant latch circuit is included, for example, in the logic circuit 2-2 as in the case of the aforedescribed log in mode, the sequential logic circuit selection signal decoder 7 supplies logic "0" only to the output lead d-2 and supplies logic "1" to the other output leads d-1, d-3, . . . , d-n. For this reason, in such case, only the NOR gate 11-2 of the data signal transmission and reception circuit 5-2 turns ON and the log out data signal to be sent via the transmission line 3-2 is extracted via said NOR gate 11-2 and the OR gate 8, as hereinafter described with reference to FIG. 3.

In the fourth, or reset mode, the mode designation signal decoder 6 supplies logic "1" to the clock mode signal lead a, the log in mode signal lead b and the log out mode signal lead c, respectively. All the gates 9-1 to 9-n, 10-1 to 10-n and 11-1 to 11-n in the data transmission and reception circuits 5-1 to 5-n, respectively, are turned OFF. More particularly, a signal is not handled between the clock distribution circuit 1 and each sequential logic circuit 2-1, 2-2, . . . ,2-n. However, it is obvious that reset processing is performed in each sequential logic circuit in the reset mode.

Figure 3:
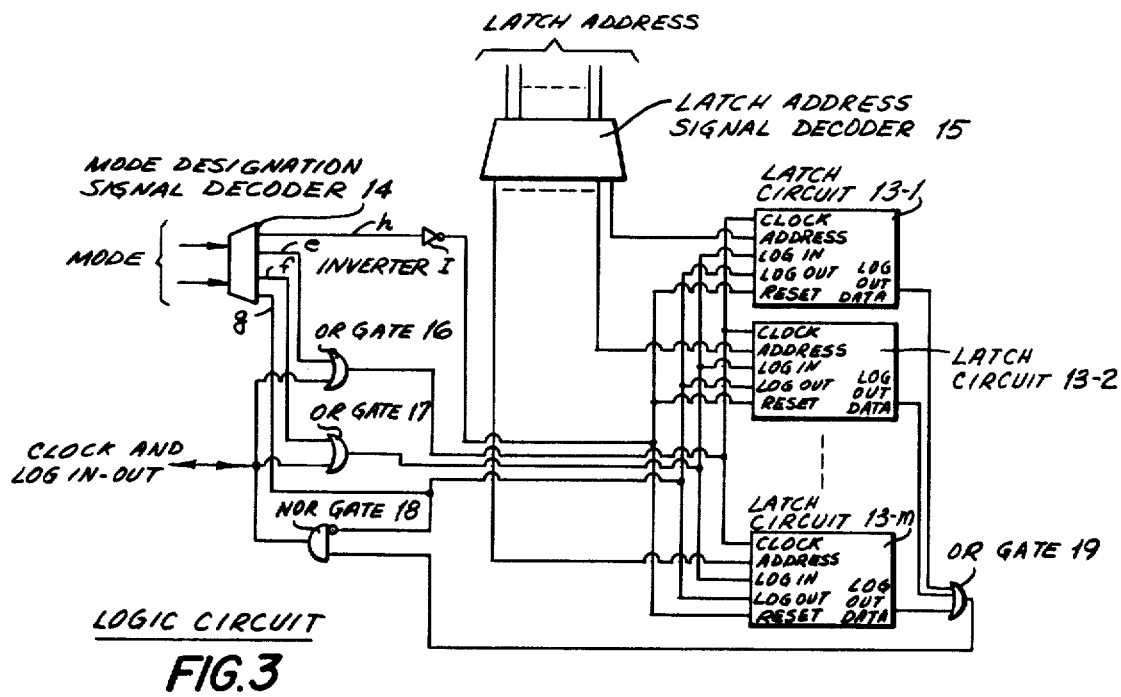
FIG. 3 is a block diagram of an embodiment of a sequential logic circuit of the system of FIG. 1.

FIG. 3 shows an embodiment of a logic circuit utilized as each of the logic circuits 2-1 to 2-n, respectively. The logic circuit of FIG. 3 comprises a plurality of latch circuits 13-1, 13-2 . . . , 13-m each having a log in-out function. A mode designation signal decoder 14 generates four types of modes including a clock mode signal, a log in mode signal, a log out mode signal and a reset signal by decoding the mode designation signal. The logic circuit of FIG. 3 further comprises a latch address signal decoder 15 which is connected between latch address lines and an address input of each of the latch circuits 13-1 to 13-m, respectively. The latch address signal decoder 15 decodes the latch address signal.

The logic circuit further comprises an OR gate 16 having an input connected to the mode designation signal decoder 14 and another input connected to a clock and log in-out line and an out-put connected to a clock input of each of the latch circuits 13-1 to 13-m, respectively. The OR gate 16 is turned ON in the clock mode. An OR gate 17 has an input connected to the mode designation signal decoder 14 and another input connected to the clock and log in-out line and an output connected to a log in input of each of the latch circuits 13-1 to 13-m, respectively. The OR gate 17 is turned ON in the log in mode. A NOR gate 18 has an input connected to a log out input of each of the latch circuits 13-1 to 13-m, respectively, and to the mode designation signal decoder 14 and another input connected to the output of an OR gate 19 having a plurality of inputs each connected to a log out data output of each of said latch circuits and an output connected to the clock and log in-out line. The NOR gate 18 is turned ON in the log out mode. The logic circuit also comprises an inverter I connected between the mode designation signal decoder 14 and a reset input of each of the latch circuits 13-1 to 13-m, respectively.

Figure 4:
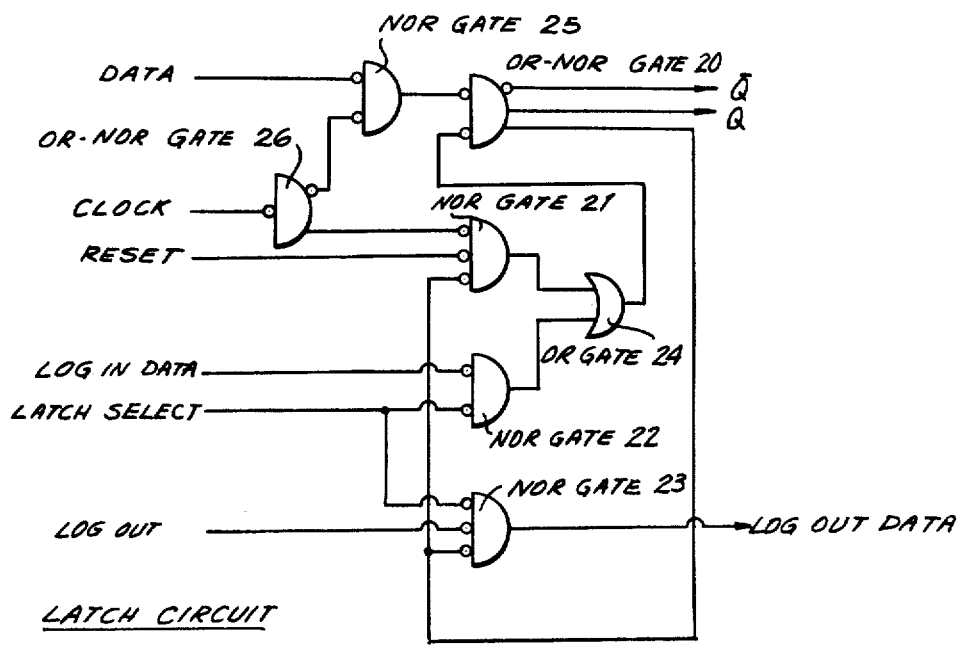
FIG. 4 is a block diagram of an embodiment of a latch circuit of the logic circuit of FIG. 3.

Each of the latch circuits 13-1 to 13-m preferably comprises the circuit of FIG. 4. The latch circuit of FIG. 4 comprises NOR gates 21, 22, 23 and 25, an OR gate 24 and OR-NOR gates 20 and 26. The NOR gate 25 has an input connected to a data line and another input connected to an output of the OR-NOR gate 26 and an output connected to an input of the OR-NOR gate 20. The OR-NOR gate 26 has an input connected to a clock line and another output connected to an input of the NOR gate 21. The NOR gate 21 has a second input connected to a reset line and a third input and an output. The NOR gate 22 has an input connected to a log in data line and another input connected to a latch select line and an output.

The NOR gate 23 has an input connected to the latch select line, a second input connected to a log out line and a third input and an output which provides log out data. The OR gate 24 has an input connected to the output of the NOR gate 21 and another input connected to the output of the NOR gate 22 and an output connected to another input of the OR-NOR gate 20. The OR-NOR gate 20 has an output which provides a Q output, a second output which provides a Q̄ output and a third output connected to the third input of each of the NOR gates 21 and 23.

The operation of the logic circuit of FIG. 3 is explained as follows with regard to the four modes of operation. In the first, or clock mode, the mode designation signal decoder 14 supplies logic "0" only to the signal lead e to turn ON the OR gate 16, and supplies the clock signal transmitted via the transmission line 3-1, 3-2, . . . , 3-n, respectively, to the clock signal input terminals of each latch circuit 13-1, 13-2, . . . ,13-m. The mode designation signal decoder 14 supplies logic "1" to the other signal leads f, g and h to turn OFF both the OR gate 17 and the NOR gate 18, and supplies a logic input signal "1" to the log in data input terminal of the NOR gate 22 and the log out designation input terminal of the NOR gate 23 in each latch circuit 13-1 to 13-m. Therefore, in each latch circuit 13-1 to 13-m, each output of the NOR gate 22 and the NOR gate 23 is logic "0" and said NOR gates are considered inoperative. Logic "0" is supplied to the reset input terminal of the NOR gate 21.

For the foregoing reason, when the clock signal is logic "0, " the NOR gate 25 transmits the data input to the OR-NOR gate 20 by inverting said data, and the NOR gate 21 provides a logic "0" output regardless of the input from the OR-NOR gate 20. The OR-NOR gate 20 inverts the input from the NOR gate 25 and provides it as an output at the Q output terminal and supplies it to the NOR gate 21. More particularly, data input is sampled. Furthermore, when the clock signal is logic "1," the output of the NOR gate 25 becomes logic "0" regardless of the data input. On the other hand, the NOR gate 21 inverts the output of the OR-NOR gate 20 and feeds it back to said OR-NOR gate 20 via the OR gate 24. Therefore, the OR-NOR gate 20 holds the data input just before the clock signal chages from logic "0" to "1." Thus, each latch circuit 13-1 to 13-m latches the data input in accordance with the clock signal.

In the second, or log in mode, the mode designation signal decoder 14 supplies logic "0" only to the signal lead f in order to turn ON the OR gate 17 and supplies the log in data signal transmitted via one of the transmission lines 3-1 to 3-m to each latch circuit of 13-1 to 13-m via the aforementioned gate 17. The decoder 14 supplies logic "1" to the other signal leads e, g and h, respectively, and turns OFF both the OR gate 16 and the NOR gate 18, making the NOR gate 23 of each latch circuit 13-1 to 13-m inoperative. Furthermore, the latch address signal decoder 15 decodes the latch address signal and selects the latch circuit 13-1 to 13-m which performs log in. In other words, the latch address signal decoder 15 provides logic "0," for example, to the latch selection signal input terminal of the latch circuit 13-1 to 13-m which performs log in and supplies, for example, logic "1" to the latch selection signal input terminal of other latch circuits 13-1 to 13-m. For this reason, in the selected latch circuit, the NOR gate 22 is made operative and logic "1" may be written as the log in data. In this case, since the gates 20, 21, 25, 26 are in the same condition as the holding in the clock mode, if data of logic "0" is held, the logic "1" cannot be logged in by the log in mode processing. Log in of logic "1" is performed in the reset mode hereinafter described.

In the third, or log out mode, the latch address signal decoder 15 decodes the latch address signal and selects one of the latch circuits 13-1 to 13-m whicn performs log out. More particularly, the latch address signal decoder 15 supplies a logic signal "0" to one latch selection signal input terminal of the latch circuits 13-1 to 13-m which performs log out and supplies logic "1" to the latch selection signal input terminal of the other latch circuit. On the other hand, the mode designation signal decoder 14 supplies logic "0" only to the signal lead g, turning ON the NOR gate 18 and supplying logic "1" to the other signal leads e, f and h, to turn OFF both OR gates 16 and 17, while providing logic "0" to the reset input terminal in each latch circuit 13-1 to 13-m and logic "1" to the log in input terminal. That is, the NOR gate 21 is maintained operative and the NOR gate 22 is made inoperative. Therefore, in one of the latch circuits 13-1 to 13-m which performs relevant log out, the NOR gate 23 is considered operative and data being held is supplied as output of said NOR gate 23 and fed to the relevant transmission line 3-1 to 3-n via the NOR gate 18 and the OR gate 19, and is then supplied to the clock distribution circuit 1.

In the fourth, or reset mode, the mode designation signal decoder 14 supplies logic "0" only to the signal lead h corresponding to the reset mode, and supplies logic "1" to the other signal leads e, f and g, respectively. That is, the gates 16, 17 and 18 are turned OFF and the NOR gates 22 and 23 in each latch circuit 13-1 to 13-m are made inoperative. Therefore, each latch circuit 13-1 to 13-m includes the OR-NOR gate 20 and the NOR gate 21 and is reset by logic "1" supplied as input to said NOR gate 21.

The preferred embodiment of the system of the invention operates as hereinbefore explained. The practical log in-out method is described as follows.

In FIG. 1, the sequential logic circuits 2-1 to 2-n and the clock distribution circuit 1 are provided, for example, for composing a logic circuit such as, for example, a data processing unit as a whole. Although it is not shown in the FIGS., a device for the diagnosis and analysis of the logic circuit is provided. The diagnostic device supplies the aforedescribed latch address signal, sequential logic circuit selection signal, mode designation signal, and log in data etc to the clock distribution circuit 1. Furthermore, the diagnostic device receives the log out data from the clock distribution circuit 1 and performs diagnosis of the logic circuit. In this case, it is obvious that not only the log in-out data, but also the input-output data of the sequential logic circuit is usual processing are used as a reference.

In this embodiment, the log in processing is executed as follows. At first, all the latches are reset by the operation of the reset mode, and thereafter the log in of logic "0" is performed by the log in mode operation only for the latch to which it is desired to set the logic "O." Thus, log in processing may be performed in a shorter time than that required for the log in of logic "0" or "1" concerning all latches.

As hereinbefore explained, in accordance with the invention, the mode designation signal is supplied respectively to the clock distribution and log in-out circuit 1 and to the sequential logic circuits 2-1 to 2-n, and the data signal is handled between both such circuits by switching the operation mode. Thereby, only one of the transmission lines 3-1 to 3-n is required between the clock distribution circuit 1 and each sequential logic circuit 2-1 to 2-n. Furthermore, the number of pins for connecting the transmission lines may be reduced.

Since each of the termination resistors 4-1 to 4-n is connected in a corresponding one of the sequential logic circuits 2-1 to 2-n, respectively, of the transmission lines 3-1 to 3-n, respectively, the clock operation mode, which requires critical operation, may be realized satisfactorily. Furthermore, in the clock mode, the clock signal to be supplied to each of the data signal transmission and reception circuits 5-1 to 5-n in the clock distribution and log in-out circuit 1 is not always limited to the same phase and, of course, the phase may be changed.

In addition, the sequential logic circuit shown in FIG. 3 has such a configuration that one mode designation signal decoder 14 and one latch address decoder 15 are provided for a plurality of latch circuits 13-1 to 13-m. The latch circuit is divided into several groups and for each group, one more designation signal decoder 14 and one latch address decoder 15 are provided.

While the invention has been described by means of a specific example and in a specific embodiment, we do not wish to be limited thereto, for obvious modifications will occur to those skilled in the art without departing from the spirit and scope of the invention.

We claim:

1. A log in-out system for logic apparatus having a plurality of logic circuits, said logic circuits having a log in-out function, said log in-out system comprising the plurality of sequential logic circuits each having first input terminals for inputting a mode signal which designates at least three modes including a clock mode, a log in mode and a log out mode, a second terminal for clock and log in-out, and a control circuit connected across the first input terminals and the second terminal for providing a clock signal as input from said second terminal when said mode signal designates the clock mode, providing log in data as input from said second terminal when said mode signal designates the log in mode and providing log out data as output from said second terminal when said mode signal designates the log out mode;

a clock distribution circuit having third input terminals for inputting the mode signal, a fourth input terminal for inputting a clock signal, fifth input terminals for inputting a circuit selection signal to select one of the sequential logic circuits, a plurality of sixth terminals for clock and log in-out, said sixth terminals corresponding to each of said sequential logic circuits, a seventh input terminal for inputting log in data, an eighth output terminal for outputting log out data, and a control circuit comprising a mode decoder connected to the first input terminals, said mode decoder having a plurality of outputs, a selection decoder connected to the fifth input terminals, said selection decoder having a plurality of outputs, and a plurality of gate circuits each corresponding to a respective one of the sequential logic circuits, each of the gate circuits being connected to each of the selection decoder outputs and to a corresponding one of the sixth terminals, said gate circuits being connected to the fourth input terminal, the seventh input terminal, the eighth output terminal and the mode decoder outputs in common;

a plurality of bidirectional lines each connecting a corresponding one of the sixth terminals of the clock distribution circuit to the second terminal of a corresponding one of the sequential logic circuits; and a mode designation signal lead connecting the first input terminal of said clock distribution circuit to each of said sequential logic circuits in common.

2. A log in-out system as claimed in claim 1, wherein each of said sequential logic circuits and said clock distribution circuit respectively comprises a single chip integrated circuit device.

3. A log in-out system as claimed in claim 1, wherein each of said sequential logic circuits includes a latch circuit having a ninth input terminal for inputting a clock signal, a tenth input terminal for inputting log in data and an eleventh output terminal for outputting log out data, and a control circuit including a mode signal decoder connected to the first input terminal for decoding the mode designation signal into a clock mode signal, a log in mode signal and a log out mode signal, a first OR gate connecting said second terminal to the ninth input terminal of the latch circuit via the clock mode signal, a second OR gate connecting said second terminal to the tenth input terminal of said latch circuit via the log in mode signal, and a NOR gate connecting said second terminal to the eleventh output terminal of said latch circuit via the log out mode signal.

4. A log in-out system as claimed in claim 3, wherein each of said sequential logic circuits includes a plurality of said latch circuits and includes a latch address input terminal for inputting a latch address for selecting one of said latch circuits, the control circuit of each of said sequential logic circuits including a latch address signal decoder and a latch selection signal input terminal connected to the latch address signal decoder.

* * * * *